Aug. 16, 1966  J. V. GRAEBNER  3,266,633
PORTABLE HOLDER FOR GUNS AND RODS
Filed Aug. 14, 1964
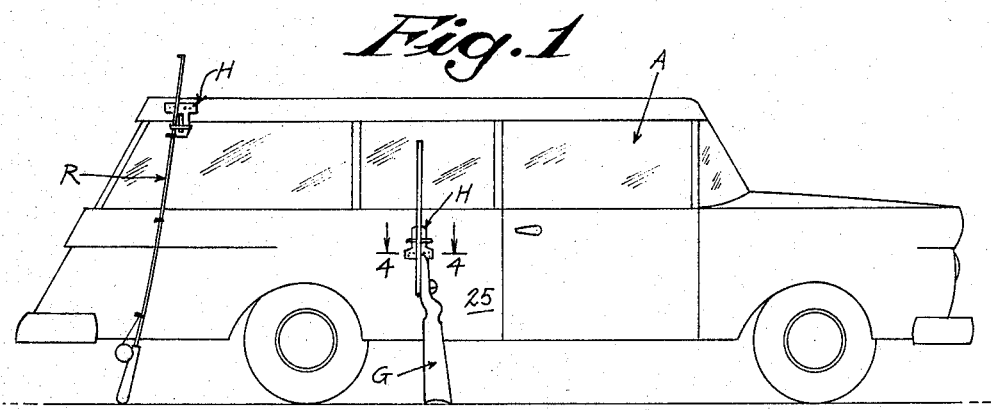
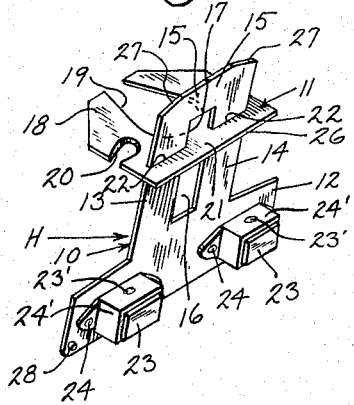
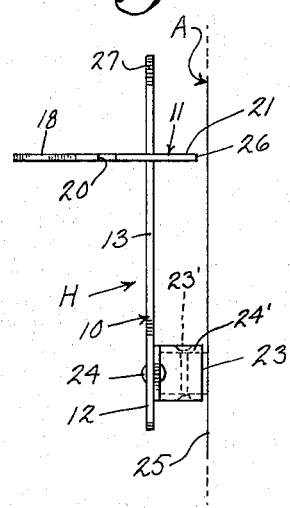
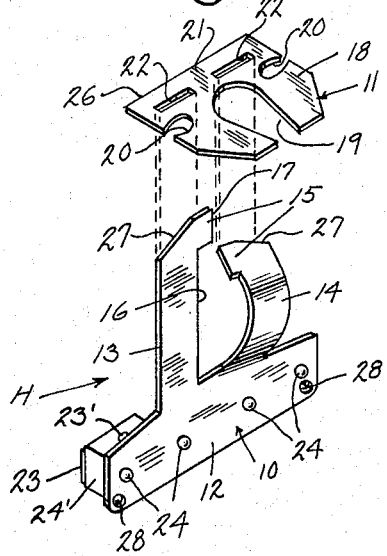
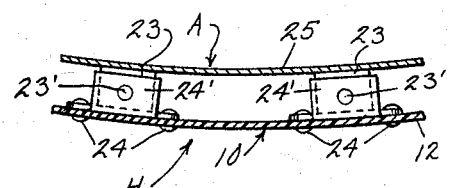
INVENTOR
JOHN V. GRAEBNER
BY *George W. Wright*

United States Patent Office 3,266,633
Patented August 16, 1966

3,266,633
PORTABLE HOLDER FOR GUNS AND RODS
John V. Graebner, Menomonee Falls, Wis.
Filed Aug. 14, 1964, Ser. No. 389,640
8 Claims. (Cl. 211—60)

This invention appertains to hunting and fishing equipment and more particularly to a portable holder or support for various types of guns, fishing rods, bows and the like, and further it represents an improvement over the gun and rod holder shown and described in my co-pending application Ser. No. 255,450, filed February 1, 1963, and now abandoned, entitled Portable Gun Rack.

As explained in my previous application, it is customary for persons hunting or fishing to drive fairly near the location where the hunting or fishing is to take place, and during the rest periods it is the usual practice to return to the automobile. In this instance, the guns or fishing rods are usually propped up against some part of the vehicle, or against a tree, and thus, there is always a danger, particularly with guns, that they will fall over and possibly discharge and cause injury to persons adjacent thereto. Even if no serious accident takes place, or the gun does not discharge, there is still the likelihood of injuring the delicate parts of the weapon or fishing rod, and of marring and scratching the finish of the automobile.

My previous invention pertained to a portable gun holder which overcame the above described difficulties, but was designed primarily to be attached by magnetic means to the fender or other part of the vehicle, and for this purpose included broadly, a flexible plastic panel carrying at its upper end an outwardly extending rib or flange provided with notches to receive the barrels of the weapons or fishing rods. While my previous invention overcame many of the above difficulties, it has been found that particularly where fishing rods are concerned, difficulty is had in attaching the holder high enough, and further, the holder is non-adjustable as to height, and is generally larger than is actually necessary.

Therefore, it is a primary object of my present invention to provide a portable gun and rod holder, which may be attached quickly to any desired part of an automotive vehicle and which will support the guns or rods in an upright position in such a manner that the main supporting structure can be adjustable as to height.

Another important object of the present invention is to provide a portable gun and rod holder which may be attached at a very low level in respect to the vehicle and also reversed and attached in a depending manner from the upper side roof portions of the vehicle.

A further object of my present invention is to adapt my holder so that it can be readily attached to non-metallic supports, such as trees, canvas tents and the like.

A prime object of my invention resides in providing a novel holder for guns and rods having a primary base member and a detachable rod and gun support member, both of which are stamped or molded from flat pieces of stock.

Still another object of my present invention is to provide a relatively compact, portable gun and rod holder carrying magnetic means so that it can be readily attached to any metal surface, such as the sides of an automotive vehicle, and being nevertheless of a size and configuration to prevent the equipment supported thereby from marring the finish of the vehicle.

A more specific object of my present invention is to provide a portable gun and rod holder formed of a flexible plastic material providing a primary base member having flexible upstanding legs and a rod and gun supporting member having slots of a size and configuration to receive the upstanding legs of the base member, whereby the supporting member can be adjusted within limits as to height when quickly associated with the base member.

A further object of my invention is to provide a portable gun and rod holder of an attractive appearance and of a simple, practical and reliable construction, that is economical to manufacture, easy to assemble and positive in its operation.

With the above and other objects in view, which will more readily appear as the nature of the invention is better understood, the same consists in the novel construction, combination and arrangement of parts, hereinafter more fully described, illustrated and claimed.

A preferred and practical embodiment of my invention is shown in the accompanying drawings, in which FIGURE 1 is a side elevational view of an automobile, showing my improved holder attached thereto in various positions, one illustrating the supporting of a gun and the like, and the other higher position, illustrating the supporting of a fishing rod;

FIGURE 2 is a rear elevational view in perspective of the assembled holder;

FIGURE 3 is an end elevational view of the holder showing its relationship to a vertical metallic support;

FIGURE 4 is a horizontal section taken through the device shown in the lower portion of FIGURE 1 of the drawings, the section being represented by the line 4—4 of FIGURE 1, and looking in the direction of the arrows, and FIGURE 5 is a front elevational view showing an exploded view of the supporting member disengaged from the primary base member, and illustrating how one of the legs can be flexed to facilitate the easy assembly of the holder.

Referring now to the drawings in detail, wherein similar reference characters designate corresponding parts throughout the several views, the letter H generally indicates my novel improved rod and gun holder, and the same includes broadly, the primary base member 10 and the upper adjustable supporting member 11. While the holder H may be of any type of flexible material which has the inherent ability to return substantially to its original form, I prefer to form both the base and supporting members of a flexible plastic. Preferably, the pieces 10 and 11 are of the injection mold type, but obviously, the same could be cut or stamped from flat sheets of plastic material. In any event, the base member 10 includes a longitudinally extending lower portion 12 and a pair of projecting legs 13 and 14, respectively. The upper ends of each leg are provided with an inwardly extending finger 15, which in the straight or unflexed position, abut one another. Actually, the base member 10 is molded or stamped in such a manner that the fingers 15 are solid and the slot 16 is formed therebetween and afterwards the bridge is cut, as at 17, to form the two inwardly directed fingers.

The supporting piece 11, is as previously mentioned, also formed of a similar material and either by injection molding or stamping from a piece of thin flexible plastic sheet, in such a manner that it provides a forwardly extending portion 18, carrying centrally therein a relatively large notch 19 to accommodate the barrels of guns or large super-casting rods, and extending inwardly from each side is a smaller notch 20, to receive the thinner fly-rods and the like. Along the straight rear portion 21 of the supporting member 1, I provide a pair of longitudinally extending spaced slots 22 and these are of a size and configuration to receive the leg portions 13 and 14 of the base member.

The lower portion 12 of the base member is provided with attaching means in the form of magnets 23, as shown, and these magnets may be attached to the rear surface by any desired means, such as rivets 24. Further, any desired type of magnet could be utilized, but in the preferred form of the invention, the magnets are of the ceramic type and extend rearwardly for a sufficient distance to properly space the base member 10 from the panel 25 of the automotive vehicle A. Actually, these ceramic magnets are held in molded plastic pockets 24' which may be separate from the lower member 10 (as shown) or molded integral therewith. Suitable anchor pins 23' are utilized to hold the magnets 23 in their pockets.

These magnets, note FIGURE 3, cooperate with the edge 26 of rear portion 21 of supporting member 11, to give this ideal spacing from the panel. Thus, when a gun G or rod R is placed in its proper notch 19 or 20, the spacing of the base member 10 will function to prevent the guns or rods from marring the finish of the vehicle. The flexible qualities of the pieces 10 and 11 are important for a number of reasons. One, they aid measurably in assembling the unit and disassembling the unit for storage and for carrying. Two (note FIGURE 4), the base member 10 will flex and conform to the contour of the automobile body or panel 25, and of course, can flex in the opposite direction, as shown in FIGURE 3, to permit the rear edge 26 of the upper supporting member 11 to contact the panel. The prime function of the flexibility of the article, however, is to enable the support member 11 to be quickly and easily associated with legs 13 and 14 of the base member 10, and the manner in which this can be accomplished is suggested in exploded FIGURE 5. Therefore, the article can be carried in a small, flat container of any type or broken down, with support member 11 lying flat on base member 10, and when it is desired to use the article, it is merely necessary to flex one of the legs 14 downwardly to expose the finger 15 on leg 13. Since the length of the inner edge of finger 15 is shorter than the length of slot 22, the finger can be readily inserted in its respective slot 22, and it should be noted that the leading edges 27 are angled downwardly so that when the finger is entirely within the slot the member 11 can be pivoted and receive the major portion of leg 13. Then member 11 is flexed upwardly and leg 14 is stretched so that finger 15 is inserted in the other slot and the device is assembled, as shown in FIGURES 2 and 3 of the drawings.

While my novel improved holder for guns and rods is primarily designed to be attached quickly to metallic supports, particularly automotive vehicles, I also provide means whereby it could be attached to a tree or to the sides of canvas tents and the like. To accomplish this, I provide at the lower end terminations of the longitudinally extending member 12, a pair of apertures 28, and these apertures, of course, can receive a small rope or cord to affix the support where desired. Thus, it can be seen that I have provided a very versatile and economical support for fishing rods and guns, which can be attached in almost any position on an automotive vehicle, and can be used where the legs 13 and 14 extend upwardly in a vertical position, as shown in the lower right hand portion, FIGURE 1 of the drawings, or the support can be reversed, and the legs can depend, as shown in the upper left hand portion of FIGURE 1, to support elongated fishing rods and the like. While I have shown and described an upper support member 11 having only means to provide a support for one gun or one large rod and two smaller rods, it is obvious that the elongated portion 12 of the lower base 10 could be extended, and additional upright legs 13 and 14 molded thereon to provide additional supports. It should also be noted that when the holder is in its assembled position upper support member 11 strengthens the legs 13 and 14, so that the device actually forms a rather firm support and that further, the support member 11 can be adjusted vertically up and down within the slot 16 according to the height of the article to be supported.

It is readily apparent that my improved holder is extremely versatile and can be easily packed with other sporting equipment, either flat or disassembled. Or it could actually be packed already assembled without taking up too much room, and obviously, could be quickly set up and attached at the point where it is necessary for use, and placing guns and fishing rods in the notches provided, will effectively prevent these articles from falling over. Obviously, the main, delicate parts of these instruments will be protected. Also, persons walking around the automobile, or opening and closing the doors, will be protected from dislodging of the supported articles.

From the foregoing, it is believed that the advantages and features of my invention will be readily apparent to those skilled in the art, and it will, of course, be understood, that changes in the form, proportion and minor details of construction may be resorted to without departing from the spirit of the invention or scope of the appended claims.

I claim:

1. A portable holder for guns, rods and the like for detachable connection to a substantially vertical support including, a base member of thin flexible sheet material, said base member having an elongated portion and a pair of spaced parallel legs extending laterally from one side of the elongated portion, an article supporting member of sheet material being provided adjacent one end with a pair of spaced slots of a size and configuration to receive respective portions of said legs in such a manner as to cooperate with said legs in one position to hold said supporting member at a substantially right angle to said base, said supporting member having notches formed in the end opposite said slots of a size and configuration to receive guns, rods and the like, and means for detachably connecting said holder to its support.

2. A portable holder as set forth in claim 1, wherein said means for attaching said holder to its support comprises a pair of spaced magnets on one side of said base member and a pair of spaced apertures adjacent the end termination of said elongated portion and said portion of said supporting member carrying said slots extending laterally substantially the same distance as said magnets.

3. A portable holder for guns, rods and the like for detachable connection to a substantially vertical support including, a base member and a supporting member formed of thin flexible sheet material, said base member having an elongated portion and a laterally extending upright portion, said upright portion carrying said supporting member at right angles thereto, means associated with said supporting member for receiving the respective portions of gun barrels, rods and the like, and means for detachably connecting said holder to said support.

4. A portable holder for guns, rods and the like as set forth in claim 3, wherein the means associated with said supporting member for receiving the gun barrels, rods and the like includes a central enlarged notch and smaller side notches.

5. A portable holder for guns, rods and the like as set forth in claim 3, wherein the means for detachably connecting said holder to said support includes a pair of spaced magnets secured to the lower end terminations of said elongated portion.

6. A portable holder for guns, rods and the like for detachable connection to a substantially vertical support including, a base member of thin flexible sheet material lying in its operative position in a substantially vertical plane, said base member having a lower elongated portion and a pair of spaced parallel upwardly extending legs, an article supporting member of flexible sheet material adapted to be associated with said base member in a horizontal position, said supporting member being provided with a pair of spaced slots adjacent one edge thereof of a size and configuration to receive respective portions of said legs in such a manner as to cooperate with said legs in said operative position to strengthen the same and to adjustably hold said supporting member in relation thereto, said supporting member having article holding notches formed in the end opposite the portions carrying the spaced slots, means associated with the lower base portion for attaching the same to said support, said means including a pair of magnets extending inwardly from said lower base portion, the inner edge of said supporting member adjacent the spaced slots extending inwardly for substantially the same distance as said magnets, and means for preventing said supporting member from being accidentally moved from off the upper end terminations of said legs.

7. A portable holder for guns and the like as set forth in claim 6, wherein said means for preventing the accidental removal of the supporting member includes, an inwardly directed finger on the end termination of each leg and said fingers terminating in abutting relationship.

8. A portable holder for guns, rods and the like for detachable connection to a substantially vertical support having an inoperable knock-down position and an operable set up position including, a base member of thin flexible sheet material, a separate supporting member of sheet material, said base member having an elongated portion and a pair of spaced parallel legs extending laterally therefrom, means associated with said lower portion for connecting said base to a support, said supporting member having article carrying notches at one end thereof and a pair of spaced parallel slots adjacent the other end thereof, said slots being of a size and configuration to snugly receive the respective portions of said parallel spaced legs, and each leg carrying at its end termination an inwardly directed finger, each finger terminating in abutting relationship with one another, whereby said holder can be stored in a flat condition with the supporting member lying in the same plane as the base member and whereby, said legs can be flexed and associated with the spaced slots of said supporting member to strengthen and stiffen the legs, and to carry the supporting member at right angles to said base.

References Cited by the Examiner

UNITED STATES PATENTS

| 1,860,925 | 5/1932 | Cranshaw | 211—60 |
| 2,959,295 | 11/1960 | Howard et al. | 211—64 |
| 2,991,036 | 7/1961 | Morgan et al. | 248—206 |
| 3,095,092 | 6/1963 | Magarian | 211—60 |

CLAUDE A. LE ROY, *Primary Examiner.*

K. J. WINGERT, *Assistant Examiner.*